United States Patent [19]

Wideman et al.

[11] Patent Number: 5,089,563

[45] Date of Patent: Feb. 18, 1992

[54] HIGH VINYL POLYBUTADIENE RUBBER CONTAINING HALOGEN HAVING ENHANCED CURE CHARACTERISTICS

[75] Inventors: Lawson G. Wideman, Tallmadge; Kenneth F. Castner, Uniontown, both of Ohio

[73] Assignee: The Goodyear Tire & Rubber Company, Akron, Ohio

[21] Appl. No.: 435,132

[22] Filed: Nov. 13, 1989

Related U.S. Application Data

[63] Continuation of Ser. No. 174,562, Mar. 29, 1988, abandoned.

[51] Int. Cl.⁵ .............................................. C08C 19/14
[52] U.S. Cl. .................................. 525/332.3; 152/564
[58] Field of Search ........................ 525/332.3, 332.3

[56] References Cited

U.S. PATENT DOCUMENTS

| | | | |
|---|---|---|---|
| 2,631,984 | 5/1953 | Crawford et al. | 260/5 |
| 4,650,832 | 3/1987 | Kowalski et al. | 525/354 |

FOREIGN PATENT DOCUMENTS

| | | |
|---|---|---|
| 648665 | 1/1964 | Belgium . |
| 7539417 | 7/1977 | France . |
| 15113 | 4/1971 | Japan . |
| 55-18417 | 2/1980 | Japan . |
| 131002 | 10/1980 | Japan . |

OTHER PUBLICATIONS

R. T. Morrissey, "Halogenation of Ethylene Propylene Diene Rubbers", Apr. 27-30, 1971, pp. 1025-1042.

*Primary Examiner*—Christopher Henderson
*Attorney, Agent, or Firm*—Alvin T. Rockhill

[57] ABSTRACT

High vinyl polybutadiene rubber has a combination of properties which makes it highly suitable for utilization in many applications. For instance, high vinyl polybutadiene possesses a number of properties that make it desirable for utilization in building tires. However, high vinyl polybutadiene rubber does not generally have optimal cure characteristics. More specifically, high vinyl polybutadiene rubber has a slow cure rate and in some cases the ultimate degree of cure which can be attained is lower than desired. This invention discloses a high vinyl polybutadiene rubber which has enhanced cure characteristics. The high vinyl polybutadiene rubbers of this invention are prepared by lightly halogenating a standard high vinyl polybutadiene which has a vinyl content of at least about 60%. This invention specifically reveals a high vinyl polybutadiene rubber having enhanced cure characteristics which is comprised of polybutadiene having a vinyl content of at least about 60% wherein the polybutadiene contains about 0.1 to about 2.5 percent halogen atoms based upon the weight of the polybutadiene.

12 Claims, No Drawings

HIGH VINYL POLYBUTADIENE RUBBER CONTAINING HALOGEN HAVING ENHANCED CURE CHARACTERISTICS

This is a continuation of application Ser. No. 07/174,562, filed on Mar. 29, 1988, now abandoned.

BACKGROUND OF THE INVENTION

It is important for polybutadienes which are used in many applications to have high vinyl contents. For example, high vinyl polybutadiene rubber possesses a number of properties that make it a highly desirable choice for utilization in building tires. However, high vinyl polybutadiene does not have good cure characteristics. More specifically, standard high vinyl polybutadiene has a slow cure rate and in some cases the degree of cure which can be attained is lower than desired. The cure characteristics of high vinyl polybutadiene become progressively worse with increasing vinyl contents. As a general rule, polybutadiene having a vinyl content of less than about 60% has acceptable cure characteristics. Polybutadiene rubbers having vinyl contents of greater than about 65% normally do not have good cure characteristics. High vinyl polybutadiene rubber having a vinyl content of greater than about 70% has poor cure characteristics and high vinyl polybutadiene rubber having a vinyl content of greater than about 80% has even worse cure characteristics.

High vinyl polybutadiene is a very important rubber which is utilized in many applications notwithstanding its poor cure characteristics. Any improvement which could be attained in the cure characteristics of high vinyl polybutadiene rubbers would be very beneficial. For instance, the cure time needed to cure rubber articles containing the high vinyl polybutadiene rubber could be reduced. This would result in reduced cycle times in curing molds which would accordingly result in greater throughputs and reduced costs. By reaching a higher degree of cure, better properties for the rubber article being manufactured could be attained.

SUMMARY OF THE INVENTION

It has been unexpectedly found that the cure characteristics of high vinyl polybutadiene rubber can be greatly improved by lightly halogenating the polybutadiene. It is important for the high vinyl polybutadiene to be halogenated to the extent that it contains about 0.1% to about 2.5% halogen atoms based upon the total weight of the polybutadiene prior to halogenation. Halogenating the high vinyl polybutadiene rubber to a greater extent reduces the ultimate state of cure which can be attained. This invention more specifically discloses a high vinyl polybutadiene rubber having enhanced cure characteristics which is comprised of polybutadiene having a vinyl content of at least about 60% wherein the polybutadiene contains about 0.1 to about 2.5 percent halogen atoms based upon the weight of the polybutadiene.

This invention also reveals a high vinyl polybutadiene rubber having enhanced cure characteristics which is prepared by halogenating polybutadiene having a vinyl content of at least about 60% to the extent that the polybutadiene contains about 0.1 to about 2.5 percent halogen atoms based upon the weight of the polybutadiene.

DETAILED DESCRIPTION OF THE INVENTION

The high vinyl polybutadiene rubbers which are halogenated in accordance with this invention will have a vinyl content of at least about 60%. In other words, at least about 60% of the double bonds in the polybutadiene will be of the 1,2-micro structure. The greatest benefits of this invention will be realized when the high vinyl polybutadiene has a vinyl content of greater than about 80%. In most cases, the high vinyl polybutadiene rubbers of this invention will have number average molecular weights of which are within the range of about 100,000 to about 400,000. The high vinyl polybutadiene rubber which is halogenated in accordance with this invention can be made utilizing any of numerous polymerization techniques which are well known to persons skilled in the art. Polar modifiers are commonly used in the preparation of high vinyl polybutadiene which is prepared utilizing lithium catalyst systems to increase the vinyl content of the polybutadiene. For instance, ethers and tertiary amines which act as Lewis bases are commonly used as modifiers. For instance, U.S. Pat. No. 4,022,959 indicates that diethyl ether, di-n-propyl ether, diisopropyl ether, di-n-butyl ether, tetrahydrofuran, dioxane, ethylene glycol dimethyl ether, ethylene glycol diethyl ther, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine can be used as modifiers. The vinyl group content of polybutadiene prepared utilizing such Lewis bases as modifiers depends upon the type and amount of Lewis base employed as well as the polymerization temperature utilized. For example, if a higher polymerization temperature is employed, a polymer with a lower vinyl group content is obtained (see A. W. Langer; A. Chem. Soc. Div. Polymer Chem. Reprints: Vol. 7 (1), 132 [1966]). For this reason it is difficult to synthesize polymers having high vinyl contents at high polymerization temperatures utilizing typical Lewis base modifiers.

In a preferred embodiment of this invention, the high vinyl polybutadiene is halogenated in the cement formed during the polymerization of the 1,3-butadiene monomer into high vinyl polybutadiene. In other words, the organic medium utilized in the solution polymerization in the synthesis of the high vinyl polybutadiene is utilized as the medium for the halogenation reaction. In such a process, it is important to strip any unreacted 1,3-butadiene monomer from the rubber cement before halogenation. This is because halogens will react preferentially with residual 1,3-butadiene monomer. Thus, the presence of residual 1,3-butadiene monomer in the rubber cement will interfere with the halogenation reaction. Residual 1,3-butadiene monomer can be removed from such a rubber cement by vacuum stripping techniques which are well known to persons skilled in the art. After residual 1,3-butadiene monomer has been stripped from the rubber cement, the high vinyl polybutadiene therein can be halogenated by simply adding the halogen to the rubber cement.

The rubber cement will normally contain from about 5 to about 35 weight percent high vinyl polybutadiene based upon the total weight of the polymer cement. In most cases such polymer cements will contain from about 10 to about 30 weight percent high vinyl polybutadiene. It is generally more preferred for economic reasons for the polymer cement to contain from about 20 to about 25 weight percent high vinyl polybutadiene. The amount of halogen added will represent from about 0.1 to about 2.5 weight percent of the weight of the polybutadiene. In most cases, it is preferred to add from about 0.2 to about 2 weight percent of the halogen based upon the weight of the high vinyl polybutadiene in the rubber cement. It is typically more preferred to add from about 0.5 to about 1 weight percent of the halogen based upon the weight of the high vinyl polybutadiene being halogenated. The halogenated high vinyl polybutadiene produced will accordingly preferably contain from about 0.1 to about 2.5 weight percent halogen atoms based upon the total weight of the polybutadiene before halogenation.

Any halogen can be utilized to halogenate the high vinyl polybutadiene rubber in accordance with this invention. However, the halogen will normally be selected from the group consisting of fluorine, chlorine, bromine, and iodine. Chlorine and bromine are preferred with bromine being more preferred.

After the appropriate amount of the halogen is added to the rubber cement, the rubber cement will normally be agitated in order to ensure that there is adequate mixing. The halogen will readily react with the high vinyl polybutadiene in the rubber cement over a very wide temperature range. As a matter of convenience, a temperature within the range of about 0° C. to about 100° C. will normally be utilized. In most cases, the halogenation will be carried out at room temperature which is typically within the range of about 20° C. to about 25° C. It is not necessary to utilize a catalyst in order to carry out the halogenation reaction.

After the high vinyl polybutadiene has been halogenated, it can be recovered from the rubber cement utilizing standard techniques. For instance, the halogenated high vinyl polybutadiene can be precipitated from the rubber cement. The halogenated high vinyl polybutadiene rubber can also be recovered from the organic solvent and residue by decantation, filtration, centrifugation, and the like. In an alternative embodiment of this invention, dry high vinyl polybutadiene can be halogenated after it is recovered from the organic solvent utilized as the polymerization medium. In one such technique, the high vinyl polybutadiene is redissolved in a suitable organic solvent and subsequently halogenated. The organic solvent which is utilized is the same general type of solvent as is used as the polymerization medium for the solution polymerization utilized in the preparation of the high vinyl polybutadiene rubber. For instance, the organic solvent utilized will normally be a saturated aliphatic hydrocarbon or an aromatic hydrocarbon. Some representative examples of suitable aromatic solvents include: benzene, toluene, xylenes, ethylbenzene, diethylbenzene, isobutylbenzene, and the like. Some representative examples of suitable aliphatic solvents include normal-hexane, cyclohexane, methyl cyclohexane, normal-heptane, normal-octane, isooctane, petroleum ether, kerosene, petroleum spirits and the like.

If the high vinyl polybutadiene is redissolved in a solvent for halogenation, there are advantages to utilizing a relatively dilute solution. For instance, dilute solutions are not as viscous and can be mixed more easily. This advantage is realized if solutions which contain from about 5 weight percent to about 15 weight percent high vinyl polybutadiene are prepared. However, it is possible to halogenate the high vinyl polybutadiene rubber in a solution which contains from about 1 to about 35 weight percent high vinyl polybutadiene. After the high vinyl polybutadiene is halogenated, it can, of course, be recovered from the solvent utilizing standard techniques.

In another alternative embodiment of this invention, the high vinyl polybutadiene can be halogenated in a bulk reaction. For instance, the high vinyl polybutadiene can be ground to a relatively small particle size and exposed to a halogen atmosphere. Such a bulk reaction can be carried out in an extruder reactor. The halogenation reaction will proceed in bulk at atmospheric pressure. In such bulk halogenations, the halogenation reaction takes place predominantly on the surface of the high vinyl polybutadiene particles. Thus, the high vinyl polybutadiene rubber is not necessarily halogenated homogeneously. For this reason, bulk halogenation is not generally a preferred means for halogenating the high vinyl polybutadiene.

After the halogenated high vinyl polybutadiene rubber having enhanced cure characteristics is recovered, it can be cured utilizing standard techniques. It is, of course, also possible to blend the halogenated high vinyl polybutadiene with additional rubbers prior to curing. In any case, the halogenated high vinyl polybutadiene will be mixed with accelerators, sulfur and any other desired rubber chemicals. Any mixing technique which will result in an essentially homogeneous mixture of the compounding ingredients throughout the rubber can be utilized. For instance, the compounding ingredients can be mixed throughout the halogenated high vinyl polybutadiene rubber on a mill mixer or in a Banbury mixer. The compounded rubber formulation will generally contain from about 0.2 phr (parts per hundred parts by weight of rubber) to about 8 phr of sulfur and from about 0.1 phr to about 2.5 phr of an accelerator. It is generally preferred for such productive compounds to contain from about 0.5 phr to about 4 phr of sulfur with it being more preferred for such compositions to contain from about 1 phr to about 2.5 phr of sulfur. It is also generally preferred for such compounded rubber formulations to contain from about 0.2 phr to about 1.5 phr of a primary accelerator which is utilized in conjunction with from about 0.02 phr to about 0.8 phr of a secondary accelerator. Such compounded rubber formulations usually also contain additional rubber chemicals, such as carbon black, antidegradants, oils, and waxes in conventional amounts.

The utilization of the halogenated high vinyl polybutadiene rubbers of this invention results in a faster rate of vulcanization and a higher state of cure. The utilization of the halogenated high vinyl polybutadiene rubber of this invention is also believed to result in the cured rubber made therefrom having a higher modulus. The utilization of the halogenated high vinyl polybutadiene rubbers of this invention in compounding tire treads will potentially help to reduce irregular wear in tires.

In most cases, the compounded halogenated high vinyl polybutadiene rubbers of this invention will be vulcanized at a temperature which is within the range of about 100° C. to about 300° C. In most cases, it will be desirable to utilize a vulcanization temperature which is within the range of about 135° C. to about 175° C.

This example is illustrated by the following examples which are presented merely for the purpose of illustration and are not to be regarded as limiting the scope of the subject invention or the manner in which it can be practiced. Unless specifically indicated otherwise, parts and percentages are given by weight.

EXAMPLES 1–7

In this series of experiments halogenated high vinyl polybutadiene rubbers containing various amounts of chlorine or bromine were prepared. Example 7 was done as a control and was not halogenated. All of the rubbers made in this experiment were compounded and cured. Table I shows the results of testing the compounded rubbers made on a rheometer.

In this series of experiments a series of high vinyl polybutadiene rubbers were halogenated with chlorine and bromine. This was done by preparing a series of rubber cements which contained 227 grams of high vinyl polybutadiene having a vinyl content of about 72% and 2,270 grams of hexane in a 1-gallon (3.79 liter) jug. The high vinyl polybutadiene had a number average molecular weight of about 200,000. The amount of chlorine or bromine shown in Table I was dissolved in 2,270 grams of hexane in separate 1-gallon (3.79 liter) jugs. The halogen solutions were quickly poured into a 5-gallon (18.93 liter) plastic-lined can containing the high vinyl polybutadiene rubber cements which were prepared. The solutions were agitated in the plastic-lined can. After the high vinyl polybutadiene samples had been halogenated, the solvent and any dissolved gas was removed by air-draft drying, followed by vacuum-oven drying at 50° C. until a constant weight was attained.

The rubber samples which were prepared were then compounded. This was done by mixing 100 parts of the respective rubbers with 45 parts of carbon black, 9 parts of processing oil, 2 parts of an antidegradant, 1 part of wax (microcrystalline and paraffinic), 3 parts of stearic acid and 3 parts of zinc oxide. Productive compounds were then prepared by adding one additional part of antidegradant, 1.4 parts of accelerators, and 1.6 parts of sulfur. The cure characteristics of the compounded rubbers were then determined using a Monsanto rheometer. The results of this experiment are shown in Table I.

TABLE I

| Ex. | Cl Added | Br Added | t25 (min.) | Maximum Torque (dN · M) | Δ T |
|---|---|---|---|---|---|
| 1 | — | 0.5% | 8.9 | 47.2 | 32.8 |
| 2 | 0.5% | — | 9.6 | 45.3 | 30.2 |
| 3 | — | 1% | 9.5 | 53.8 | 35.2 |
| 4 | 1% | — | 10.5 | 50.8 | 28.7 |
| 5 | — | 2% | 10.6 | 58.7 | 25.2 |
| 6 | 2% | — | 10.5 | 58.3 | 24.6 |
| 7 | — | — | 13.3 | 41.0 | 27.5 |

In Examples 1, 3, and 5, 1.14 grams, 2.27 grams and 4.54 grams of bromine were added to the high vinyl polybutadiene rubber cement. In Examples 2, 4, and 6, 1.14 grams, 2.27 grams, and 4.54 grams of chlorine were added to the rubber cement, respectively. The time required to reach 25% of complete cure is designated in Table I as t25. The time required to reach 25% cure is very important because it is a good indicator of the cure rate being attained. In fact, molded articles such as tires are commonly removed from the mold being utilized to cure the article before a complete cure is attained. This can be done because the molded rubber article being manufactured will stay hot and continue to cure even after it is removed from the mold. For example, tires are frequently removed from the mold after only about 25% of complete cure has been attained. For this reason it is highly desirable to minimize the time required to attain 25% of complete cure (t25). As can be seen by comparing Example 1 with the control (Example 7), a 33% reduction in t25 was attained by incorporating 0.5% bromine into the high vinyl polybutadiene. This could accordingly result in a 33% reduction in mold cycle times which would greatly increase throughputs and reduced costs.

The maximum torque attained for all of the rubber samples tested is also shown in Table I. Higher maximum torque is believed to be related to higher crosslink density. As can be seen by comparing Examples 1–6 with the control, the halogenated high vinyl polybutadiene rubbers all attained a much higher maximum torque than did the control. The difference between maximum torque and minimum torque is denoted as ΔT and is an indicator of the state of cure attained. As can be seen, Examples 1–4 all had a ΔT which is significantly higher than that of the control. In Examples 5 and 6 which were halogenated to a greater extent, ΔT was diminished. Thus, in cases where it is desirable to have a high state of cure, the halogenated high vinyl polybutadiene rubber will not be halogenated to over about 1.5 weight percent based upon the weight of the high vinyl polybutadiene rubber prior to halogenation.

These examples show that high vinyl polybutadiene rubbers can be lightly halogenated in order to enhance cure characteristics. In fact, cure rate, crosslink density, and the degree of cure can all be increased by lightly halogenating high vinyl polybutadiene rubbers.

While certain representative embodiments and details have been shown for the purpose of illustrating the present invention, it will be apparent to those skilled in this art that various changes and modifications can be made therein without departing from the scope of the present invention.

What is claimed is:

1. A high vinyl polybutadiene rubber having enhanced cure characteristics which is comprised of polybutadiene rubber having a vinyl content of at least about 60% wherein the polybutadiene rubber contains about 0.2 to about 2 percent halogen atoms based upon the weight of the polybutadiene rubber and wherein the polybutadiene rubber has a number average molecular weight which is within the range of about 100,000 to about 400,000.

2. A high vinyl polybutadiene rubber having enhanced cure characteristics which is prepared by halogenating polybutadiene rubber having a vinyl content of at least about 60% to the extent that the polybutadiene rubber contains about 0.2 to about 2 percent halogen atoms based upon the weight of the polybutadiene rubber and wherein the polybutadiene rubber has a number average molecular weight which is within the range of about 100,000 to about 400,000.

3. A high vinyl polybutadiene rubber as specified in claim 2 wherein said halogen atoms are selected from the group consisting of chlorine atoms and bromine atoms.

4. A high vinyl polybutadiene rubber as specified in claim 1 wherein said halogen atoms are bromine atoms.

5. A high vinyl polybutadiene rubber as specified in claim 1 wherein said halogen atoms are chlorine atoms.

6. A high vinyl polybutadiene rubber as specified in claim 1 wherein said halogen atoms are selected from the group consisting of fluorine atoms, chlorine atoms, bromine atoms and iodine atoms.

7. A high vinyl polybutadiene rubber as specified in claim 4 wherein the polybutadiene contains from about 0.5 to about 1 percent halogen atoms based upon the weight of the polybutadiene prior to halogenation.

8. A high vinyl polybutadiene rubber as specified in claim 5 wherein the polybutadiene contains from about 0.5 to about 1 percent chlorine atoms based upon the weight of the polybutadiene prior to halogenation.

9. A high vinyl polybutadiene rubber as specified in claim 1 wherein the polybutadiene has a vinyl content of at least about 70%.

10. A high vinyl polybutadiene rubber as specified in claim 1 wherein said polybutadiene has a vinyl content of at least about 80%.

11. A high vinyl polybutadiene rubber as specified in claim 2 wherein the halogenation is conducted in a rubber cement of the high vinyl polybutadiene rubber.

12. A high vinyl polybutadiene rubber as specified in claim 11 wherein the rubber cement contains from about 3 to about 25 weight percent high vinyl polybutadiene based upon the total weight of the cement.

* * * * *